L. FORNAS.
GAS PRODUCER.
APPLICATION FILED FEB. 1, 1919.

1,422,093.

Patented July 11, 1922.
2 SHEETS—SHEET 1.

INVENTOR
Louis Fornas,
by Chas. J. O'Neill,
ATTORNEY

UNITED STATES PATENT OFFICE.

LOUIS FORNAS, OF PARIS, FRANCE.

GAS PRODUCER.

1,422,093.    Specification of Letters Patent.    Patented July 11, 1922.

Application filed February 1, 1919. Serial No. 274,465.

*To all whom it may concern:*

Be it known that I, LOUIS FORNAS, citizen of French Republic, residing at Paris, France, have invented new and useful Improvements in Gas Producers, of which the following is a specification.

This invention relates to a gas producer of single or multiple type, comprising a fuel feeder or feeders descending into a smoke chamber; a drier or driers arranged beneath the said fuel feeder or feeders, and contained within a chamber into which air is introduced for supporting the combustion of a furnace or furnaces disposed beneath the drying chamber or chambers, and located within a chamber for the circulation of gas; and beneath the grate of the furnace or furnaces an ash pan with door.

Figure 1:
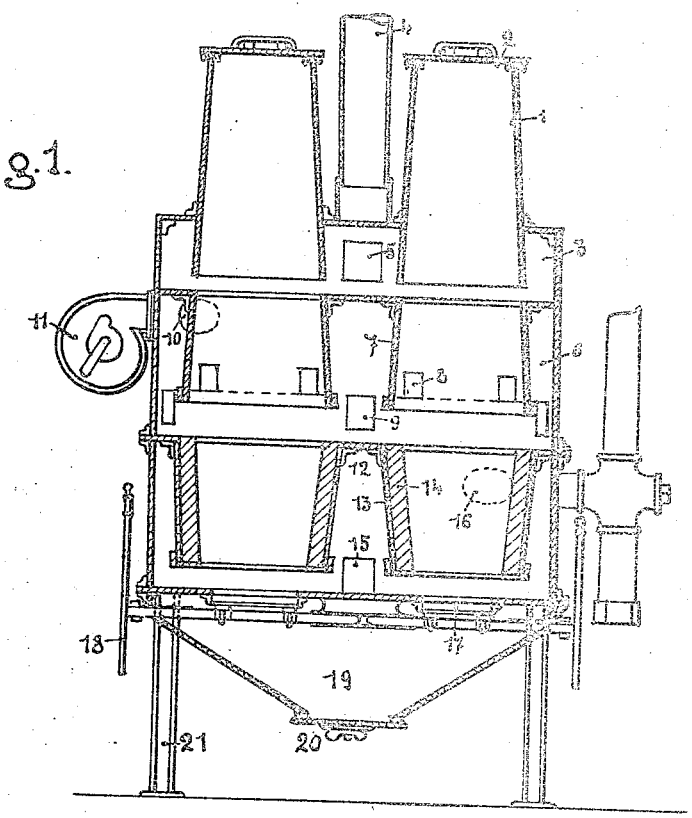
Figure 2:
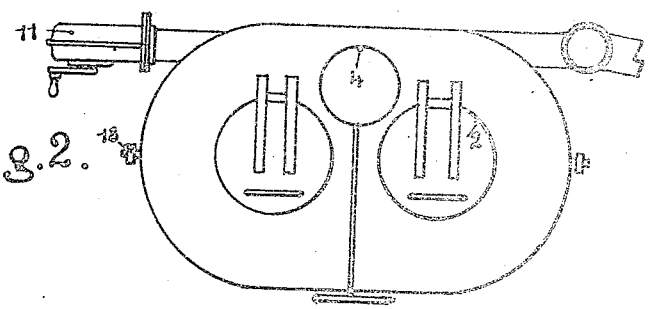

In the annexed drawings Fig. 1 is a vertical section of a duplex type gas producer in accordance with my invention and Fig. 2 is a plan thereof.

Figure 3:
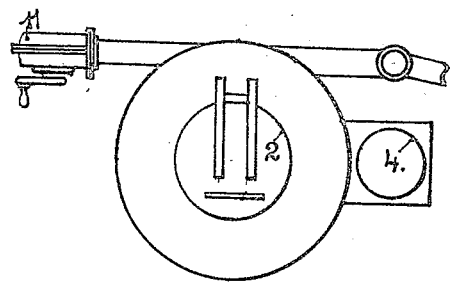
Figure 4:
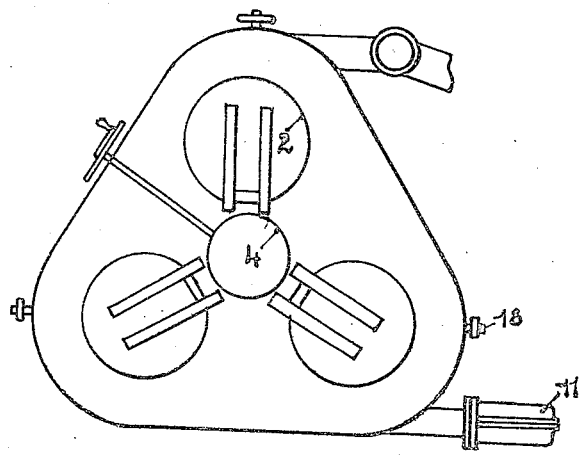
Figure 5:
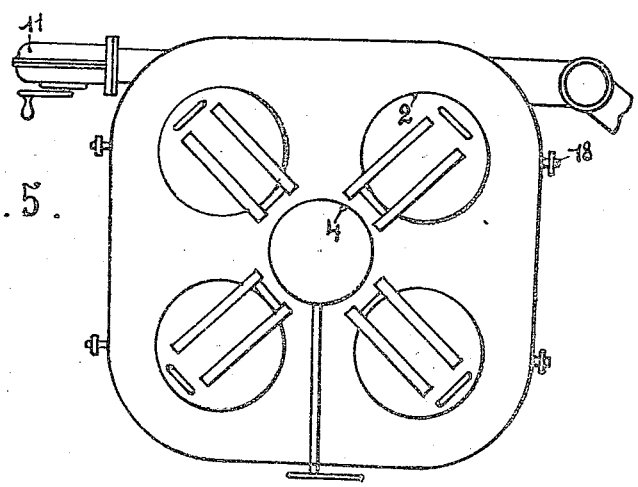

Figs. 3, 4, 5 are plan views of gas producers, respectively of single, triple, and quadruple type.

1 indicates the fuel feeders in the form of truncated conical tubes, provided with the covers 2 and descending into a smoke chamber 3 having a chimney 4 for the exit of the smoke, and openings 5 for cleaning the chamber.

Beneath the fuel feeders 1, and located within the chamber 6, are arranged the driers 7, also in the form of truncated conical tubes and having towards their bases openings 8 in front of doors 9 in the chamber 6 for inspecting the working of the apparatus and for stirring the fuel.

10 indicates apertures for the admission of air forced in by an air compressor 11, or it may be drawn in by a pipe communicating with the pipe through which the gas produced is evacuated.

Below the driers 7, in a chamber 12 forming a receiver, are arranged the furnaces 13, lined with fire clay 14. The chamber 12 may have apertures 15 for access, and has an exhaust or discharge 16 for the gas which subsequently passes through divers apparatus such as dryers, washers, coolers and the like, according to requirements.

Beneath the furnaces 13 are movable grates 17 operated by the levers 18, and beneath these grates is the ash pan 19 with its discharge door 20.

The apparatus is mounted on a suitable support 21.

The operation of the apparatus is as follows:

The fuel placed in the feeders 1, and which may consist of wood sawdust, lignite, peat, roots, tan bark, etc., in a more or less moist state descends as combustion progresses into the drier 7 where it loses the greater part of its moisture, which with the smoke escapes into the chamber 3 and leaves the latter by the chimney 4.

From the drier 7 the fuel descends into the furnace 13 lined with fire clay 14 where slow and incomplete combustion is produced, the cinders falling through the grate 17 into the ash pan 19 from whence they may be removed by the door 20.

The air, as above stated is forced into the chamber 6 by the air compresser 11, or it may be drawn in through a pipe, or by the motor in the gas purifying apparatus.

By reason of the arrangement of the apparatus this air forms a circular stream or current which is ingulfed at the top of the furnace and thus produces inverted combustion.

The gases produced by combustion leave the bottom of the furnace and flow, also in a circular stream, in the chamber 12 in which the ashes are deposited, from whence the gases are drawn through the outlet 16 to various apparatus for drying, washing, etc., in order to make the poor gas produced utilizable.

During combustion the fumes are compelled to traverse the mass of incandescent fuel, and thus the tar and other volatile impurities are burned and reduced to gas, so that the gas obtained, owing to the arrangement of the apparatus, is pure and of good quality.

The gas producers, in lieu of being made in the duplex form, Figs. 1 and 2, may be of single type, Fig. 3; or of triple or quadruple type, Figs. 4 and 5; and if desired the number of gas producing units combined in one apparatus may be increased, if needed, beyond this.

Having now particularly described and ascertained the nature of my said invention, and in what manner the same is to be performed, I declare that what I claim is:

1. A gas producer, comprising a fuel feeder, a smoke chamber disposed beneath said feeder and into which it opens, an air chamber beneath the smoke chamber, an open-ended drier for the fuel disposed within the air chamber immediately below the discharge end of the feeder means for supplying air to the air chamber, an open-ended furnace immediately below said drier and into which the fuel is discharged from the drier, and a chamber wherein said furnace is located disposed beneath said air chamber and having a discharge opening therein; the air delivered to the air chamber by the air supply means being caused to circulate through that chamber and around the drier, and thereafter being drawn through the top of the furnace to support combustion therein and exhausted through said opening with the gases of combustion.

2. In a gas producer, the combination of a horizontal air chamber having a drier therein, means for supplying fuel to the drier to pass therethrough, means for supplying air to said chamber at a point above the zone of combustion, suitable for carrying of moisture from the combustible and for supporting combustion, a horizontal gas chamber beneath the air chamber and provided with a discharge opening through which the gases produced are exhausted, and a furnace in the gas chamber communicating at its top with the air chamber at a point immediately below the drier, said furnace being supplied with air from said chamber and fuel from said drier.

In testimony whereof I have signed my name to this specification in the presence of two subscribing witnesses.

LOUIS FORNAS.

Witnesses:
VICTOR MARENDOWSKI,
JOHN F. SIMONS.